US011503112B2

(12) United States Patent
Lahr et al.

(10) Patent No.: US 11,503,112 B2
(45) Date of Patent: *Nov. 15, 2022

(54) SELECTIVE ACCESS OF MULTI-RATE DATA FROM A SERVER AND/OR PEER

(71) Applicant: ORIONSWAVE, LLC, Snoqualmie, WA (US)

(72) Inventors: Nils B. Lahr, Snoqualmie, WA (US); John Morris, Washougal, WA (US); A.J. Gregory, Seattle, WA (US); Robert Green, Seattle, WA (US)

(73) Assignee: ORIONSWAVE, LLC, Snoqualmie, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/167,916

(22) Filed: Feb. 4, 2021

(65) Prior Publication Data

US 2021/0227020 A1 Jul. 22, 2021

Related U.S. Application Data

(63) Continuation of application No. 16/579,677, filed on Sep. 23, 2019, now Pat. No. 10,944,813, which is a
(Continued)

(51) Int. Cl.
*H04L 67/101* (2022.01)
*H04L 67/104* (2022.01)
(Continued)

(52) U.S. Cl.
CPC ............ *H04L 67/101* (2013.01); *H04L 67/06* (2013.01); *H04L 67/1001* (2022.05);
(Continued)

(58) Field of Classification Search
CPC ... H04L 67/011; H04L 67/06; H04L 67/1002; H04L 67/104; H04L 67/108; H04L 67/1091; H04L 67/1093
See application file for complete search history.

(56) References Cited

U.S. PATENT DOCUMENTS 3,813,845 A 6/1974 Weikert
6,259,819 B1 7/2001 Andrew et al.
(Continued)

OTHER PUBLICATIONS

A. P. C. d. Silva, E. Leonardi, M. Mellia and M. Meo, "A Bandwidth-Aware Scheduling Strategy for P2P-TV Systems," 2008 Eighth International Conference on Peer-to-Peer Computing, Aachen, 2008, pp. 279-288. doi: 10.1109/P2P.2008.38.
(Continued)

*Primary Examiner* — Viet D Vu
(74) *Attorney, Agent, or Firm* — Workman Nydegger

(57) ABSTRACT

Aspects of the disclosed subject matter are directed to facilitating peer-to-peer data exchange in a common domain. In accordance with one embodiment, a method is provided for obtaining content from one or more peers that are connected to the domain. The method includes registering a peer with a super-peer when a connection to the domain is established. Then, the connecting peer obtains data that describes various network conditions and identifies chunks of content available from other peers. In downloading content from other peers, heuristics are applied to select between available chunks that are potentially encoded at different bitrates. The heuristics account for the network conditions between peers and balance the potential need to quickly access content with the desire to obtain high quality content.

20 Claims, 6 Drawing Sheets

Related U.S. Application Data continuation of application No. 15/425,912, filed on Feb. 6, 2017, now Pat. No. 10,425,474, which is a continuation of application No. 12/791,789, filed on Jun. 1, 2010, now Pat. No. 9,565,239.

(60) Provisional application No. 61/182,656, filed on May 29, 2009.

(51) Int. Cl.
    *H04L 67/1087*      (2022.01)
    *H04L 67/1074*      (2022.01)
    *H04L 67/1001*      (2022.01)
    *H04L 67/06*      (2022.01)

(52) U.S. Cl.
    CPC .......... *H04L 67/104* (2013.01); *H04L 67/108* (2013.01); *H04L 67/1091* (2013.01); *H04L 67/1093* (2013.01)

(56) References Cited

U.S. PATENT DOCUMENTS

| | | | |
|---|---|---|---|
| 6,847,974 B2 | 1/2005 | Wachtel | |
| 6,947,923 B2 | 9/2005 | Cha et al. | |
| 7,174,385 B2 | 2/2007 | Li | |
| 7,284,196 B2 | 10/2007 | Skeen et al. | |
| 7,328,209 B2 | 2/2008 | Das et al. | |
| 7,478,105 B2 | 1/2009 | Albornoz et al. | |
| 7,478,165 B2 | 1/2009 | Gemmell | |
| 7,533,122 B2 | 5/2009 | Drumm et al. | |
| 7,593,967 B2 | 9/2009 | Harnsberger et al. | |
| 7,636,702 B2 | 12/2009 | Perl et al. | |
| 7,673,282 B2 | 3/2010 | Amaru et al. | |
| 7,707,147 B2 | 4/2010 | Steels et al. | |
| 7,720,778 B2 | 5/2010 | Friesen et al. | |
| 7,730,098 B2 | 6/2010 | Lim et al. | |
| 7,761,480 B2 | 7/2010 | Toledano et al. | |
| 7,853,618 B2 | 12/2010 | Yuan et al. | |
| 7,877,726 B2 | 1/2011 | Sabbouh | |
| 7,899,804 B2 | 3/2011 | Naaman et al. | |
| 7,899,861 B2 | 3/2011 | Feblowitz et al. | |
| 7,930,288 B2 | 4/2011 | Delgado et al. | |
| 7,953,882 B2 | 5/2011 | Shukla et al. | |
| 7,958,016 B2 | 6/2011 | Huaulme et al. | |
| 8,055,788 B1 | 11/2011 | Chan et al. | |
| 8,433,715 B1 | 4/2013 | Mirhaji | |
| 8,458,333 B1 | 6/2013 | Stoica et al. | |
| 8,874,552 B2 | 10/2014 | Jehuda | |
| 8,983,995 B2 | 3/2015 | Hsu et al. | |
| 8,996,555 B2 | 3/2015 | Kuchmann-Beauger et al. | |
| 9,720,895 B1 | 8/2017 | Warren et al. | |
| 2003/0074403 A1* | 4/2003 | Harrow ............... | H04L 69/329 709/203 |
| 2003/0191627 A1 | 10/2003 | Au | |
| 2004/0172476 A1* | 9/2004 | Chapweske .......... | H04L 67/325 709/231 |
| 2004/0236863 A1 | 11/2004 | Shen et al. | |
| 2005/0125717 A1 | 6/2005 | Segal et al. | |
| 2006/0053209 A1 | 3/2006 | Li | |
| 2006/0069800 A1 | 3/2006 | Li | |
| 2006/0074980 A1 | 4/2006 | Sarkar | |
| 2006/0080319 A1 | 4/2006 | Hickman et al. | |
| 2006/0080454 A1 | 4/2006 | Li | |
| 2006/0136194 A1 | 6/2006 | Armstrong et al. | |
| 2006/0218222 A1 | 9/2006 | Brahmbhatt et al. | |
| 2007/0033221 A1 | 2/2007 | Copperman et al. | |
| 2007/0112973 A1* | 5/2007 | Harris ............... | H04L 29/06027 709/232 |
| 2007/0162487 A1 | 7/2007 | Frailey | |
| 2007/0239430 A1 | 10/2007 | Ollason | |
| 2007/0294422 A1 | 12/2007 | Zuckerman et al. | |
| 2008/0065771 A1 | 3/2008 | Marvit et al. | |
| 2008/0091838 A1 | 4/2008 | Miceli | |
| 2008/0098123 A1* | 4/2008 | Huang .................. | H04L 67/104 709/231 |
| 2008/0104032 A1 | 5/2008 | Sarkar | |
| 2008/0133767 A1* | 6/2008 | Birrer .................. | H04L 67/104 709/231 |
| 2008/0195743 A1 | 8/2008 | Brueck et al. | |
| 2008/0205291 A1* | 8/2008 | Li ........................... | H04L 47/70 370/254 |
| 2008/0208976 A1 | 8/2008 | Chapalamadugu et al. | |
| 2008/0235746 A1 | 9/2008 | Peters et al. | |
| 2009/0031038 A1 | 1/2009 | Shukla et al. | |
| 2009/0282160 A1 | 11/2009 | Wang et al. | |
| 2009/0282162 A1 | 11/2009 | Mehrotra et al. | |
| 2009/0300203 A1 | 12/2009 | Virdi et al. | |
| 2009/0300673 A1 | 12/2009 | Bachet et al. | |
| 2010/0094930 A1 | 4/2010 | Griff et al. | |
| 2010/0094950 A1 | 4/2010 | Zuckerman et al. | |
| 2010/0095012 A1 | 4/2010 | Zuckerman et al. | |
| 2010/0144330 A1* | 6/2010 | Ahlin .................... | G06F 16/957 455/418 |
| 2010/0231721 A1 | 9/2010 | Meloche et al. | |
| 2011/0196670 A1 | 8/2011 | Dang et al. | |
| 2011/0246608 A1 | 10/2011 | Wu et al. | |
| 2011/0264739 A1 | 10/2011 | Wang et al. | |
| 2011/0320114 A1 | 12/2011 | Buxton et al. | |
| 2013/0007186 A1* | 1/2013 | Liu ....................... | H04L 67/289 709/213 |
| 2013/0091113 A1 | 4/2013 | Gras | |
| 2013/0275448 A1 | 10/2013 | Mirhaji | |
| 2015/0019202 A1 | 1/2015 | Tremblay et al. | |
| 2015/0039295 A1 | 2/2015 | Soschen | |
| 2016/0246820 A1 | 8/2016 | Depaoli et al. | |
| 2017/0124158 A1 | 5/2017 | Mirhaji | |
| 2020/0195710 A1 | 6/2020 | Lahr et al. | |

OTHER PUBLICATIONS

Final Office Action for U.S. Appl. No. 12/791,789, dated Feb. 13, 2014, Nils B. Lahr, "Selective Access of Multi-Rate Data From a Server and/or Peer", 44 pages.

Final Office Action for U.S. Appl. No. 12/791,789, dated Jan. 31, 2013, Nils B. Lahr et al., "Selective Access of Multi-Rate Data From a Server and/or Peer", 22 pages.

Hao Yin, Xuening Liu, Tongyu Zhan, Vyas Sekar, Feng Qiu, Chuang Lin, Hui Zhang, and Bo Li. 2009. Design and deployment of a hybrid CDN-P2P system for live video streaming: experiences with LiveSky. In Proceedings of the 17th ACM international conference on Multimedia (MM '09). ACM, New York, NY, USA, 25-34. DOI: http://dx.doi.org/10.1145/1631272.16.

Non-Final Office Action received for U.S. Appl. No. 16/579,677, dated Jul. 27, 2020, 7 pages.

Notice of Allowance received for U.S. Appl. No. 16/579,677, dated Nov. 5, 2020, 5 pages.

Notification of the Transmittal of the International Search Report and the Written Opinion dated Jan. 7, 2011, issued in corresponding International Application No. PCT/US2010/036953, filed Jun. 1, 2010, 8 pages.

Office action for U.S. Appl. No. 12/791,789, dated Aug. 1, 2013, Lahr et al., "Selective Access of Multi-Rate Data From a Server and/or Peer", 43 pages.

X. Hei, C. Liang, J. Liang, Y. Liu and K. W. Ross, "A Measurement Study of a Large-Scale P2P IPTV System," in IEEE Transactions on Multimedia, vol. 9, No. 8, pp. 1672-1687, Dec. 2007. doi: 10.1109/TMM.2007.907451.

* cited by examiner

SELECTIVE ACCESS OF MULTI-RATE DATA FROM A SERVER AND/OR PEER

CROSS-REFERENCE(S) TO RELATED APPLICATION(S)

This application is a continuation of commonly owned U.S. patent application Ser. No. 16/579,677, filed Sep. 23, 2019, entitled "SELECTIVE ACCESS OF MULTI-RATE DATA FROM A SERVER AND/OR PEER", which issued as U.S. Pat. No. 10,944,813 on Mar. 9, 2021, which is a continuation of Ser. No. 15/425,912, filed Feb. 6, 2017, entitled "SELECTIVE ACCESS OF MULTI-RATE DATA FROM A SERVER AND/OR PEER," now U.S. Pat. No. 10,425,474, which is a continuation of commonly owned U.S. patent application Ser. No. 12/791,789, filed Jun. 1, 2010, entitled "SELECTIVE ACCESS OF MULTI-RATE DATA FROM A SERVER AND/OR PEER," now U.S. Pat. No. 9,565,239, which claims the benefit of U.S. Provisional Patent Application Ser. No. 61/182,656, filed May 29, 2009, entitled "SELECTIVE ACCESS OF MULTI-RATE DATA FROM A SERVER AND/OR PEER", which is hereby incorporated in its entirety by reference.

BACKGROUND

Streaming distribution of live and on-demand audio and/or video over the Internet is challenging due to the dynamic nature of various elements utilized in the delivering and rendering of content. Traditionally, users would have to select a specific bitrate to match their expected download speeds, or would allow an automated detection system to select the appropriate bitrate. However, bandwidth conditions change dynamically, and bandwidth availability may drop dramatically over the course of a sustained connection. To compensate for such changes, a user may consider selecting the lowest offered bitrate for a given piece of content, in consideration of the likelihood that network conditions will deteriorate from a peak at the beginning of the connection.

The market penetration of High Definition (HD) media delivery has suffered from this phenomenon, as it is not typical that an end user will have sufficient bandwidth to sustain a bitrate for transmission of an entire HD-quality media stream that is longer than a few minutes. Additionally, scaling delivery of HD content to serve ever-increasing numbers of users is difficult as the high quality of the content also consumes server bandwidth. This higher server bandwidth increases server costs, especially when attempting to preserve guaranteed quality of service metrics.

While multiple solutions exist that attempt to solve problems in providing large quantities of HD-quality media over the Internet, these existing solutions all have drawbacks. One such solution purportedly allows storing a single media presentation in multiple different bitrates, and indexing each version to allow switching between versions as network conditions change and bandwidth fluctuates. However, these types of solutions have drawbacks when attempting to provide smooth transitions between bitrates, due to the location of keyframes. Also, this solution continues to use a centralized download source, which does not scale well and may result in "bottlenecking" problems as described above.

Peer-to-peer solutions for providing massive media download capabilities have also emerged. However, these existing solutions are not well suited for providing streaming of live content. Generally, such solutions break the content into fragments which are distributed among multiple peer systems. When a client downloads a file from the peer-to-peer network using these existing technologies, it may not take into account the order of the fragments requested, which makes it difficult or impossible to deliver media in a streaming format. Another problem with existing peer-to-peer solutions is that they generally require installation of stand-alone client software on each peer. End users are increasingly wary of installing native executables from untrusted sources. As such, requiring such client software to be installed will decrease the popularity of any peer-to-peer system.

Even more problems arise when attempting to increase acceptance by building a peer-to-peer distribution system to run within a generic host application such as a web browser. Web browsers allow rich application content to be executed without installing additional software on the local system. However, web browsers typically segregate access to local resources based on domains. In other words, when a web application is connected to the "foo.com" domain, the web application is only able to access local storage related to the "foo.com" domain. Once the web browser is directed to a different domain, the local content from the "foo.com" domain is inaccessible. Hence, the number of peers in a peer-to-peer distribution system is limited to peers who are currently accessing the same domain, and these peers will be unavailable when users navigate away from that domain. Further, web browsers can allow more than a single copy of a web site to be viewed at a single time. This means that a peer-to-peer application running on such a web site would either run into collisions when both copies attempt to open the same client port, or that each copy would select a different port, and could not be located by peers attempting to connect to a well-known peer client port. Existing peer-to-peer distribution systems are not currently able to operate with such high unpredictability in peer availability and contact information.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Aspects of the disclosed subject matter are directed to facilitating peer-to-peer data exchange in a common domain. In accordance with one embodiment, a method is provided for obtaining content from one or more peers that are connected to the domain. The method includes registering a peer with a super-peer when a connection to the domain is established. Then, the connecting peer obtains data that describes various network conditions and identifies chunks of content available from other peers. In downloading content from other peers, heuristics are applied to select between available chunks that are potentially encoded at different bitrates. The heuristics account for the network conditions between peers and balance the potential need to quickly access content with the desire to obtain high quality content.

DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

Aspects of the present disclosure are directed to a domain-based peer-to-peer network that allows users to access content from potentially multiple peers. The examples provided below may describe functionality of the present disclosure with reference to obtaining media data such as streaming video and audio However, those skilled in the art and others will recognize that the present disclosure may be applied to exchange other types of data without departing from the scope of the claimed subject matter. Moreover, the illustrative examples and descriptions provided below are not intended to be exhaustive or to limit the claimed subject matter to the precise forms disclosed. Similarly, any steps described below may be interchangeable with other steps or combinations of steps in order to achieve the same or substantially similar result.

Figure 1:
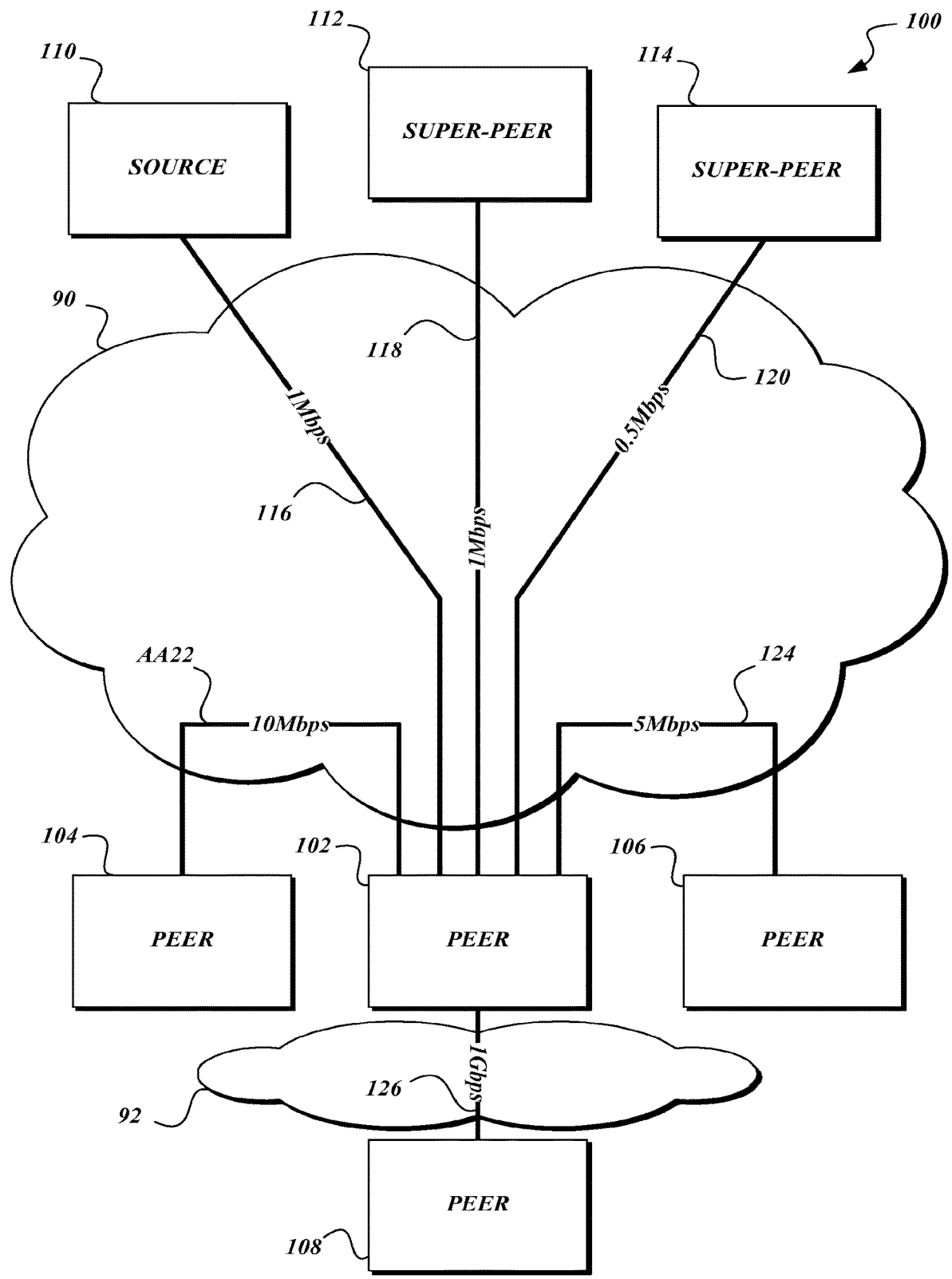
FIG. 1 is a block diagram depicting an exemplary environment where described embodiments of the disclosed subject matter can be implemented.

FIG. 1 illustrates one embodiment of a peer-to-peer content distribution system 100 according to various aspects of the present disclosure. The system 100 will be described from the perspective of a peer 102 for ease of discussion, but it will be recognized by one of skill in the art that each of the peers 104, 106, 108 are essentially interchangeable with regard to this discussion.

As illustrated, client peer 102 is a computing device coupled to a wide area network 90 and a local area network 92. In one embodiment, client peer 102 is a desktop computer, but in other embodiments client peer 102 can be any device capable of connecting to a network and executing a generic web browser. Client peer 102 uses its generic web browser to connect to a source server 110, which provides a web application that enables peer-to-peer communication. The other peers 104, 106, 108 are also executing the web application that enables peer-to-peer communication, and are visiting the same domain as the client peer 102.

Upon startup, client peer 102 finds and connects to one of a plurality of super-peers such as super-peers 112-114. In one embodiment, super-peers 112-114 are specialized servers adapted to act as super-peers. In another embodiment, super-peers 112-114 are substantially similar to the other peers taking part in the system 100, but have been elected or otherwise designated to act as a super-peer. The super-peers 112-114 each store information identifying the other peers participating in the system 100. As described in further detail below, the client peer 102 requests information from one of the plurality of super-peers 112-114, in order to identify and connect to remote server peers 104, 106, and local server peer 108. The information stored by the super-peer is described in further detail below.

Once connected to one or more of the remote server peers 104, 106 and the local server peer 108, client peer 102 determines a plan for downloading content such as a media file. This plan can take into consideration which peers have the various portions of the media file, and can also take into consideration variable amounts of bandwidth available between the client peer 102 and other portions of the system 100. For example, in a traditional media download model, the client peer 102 downloads the entire media file from a centralized location such as original source server 110. However, in the peer-to-peer model, it can be more efficient to download the media file in chunks from a multitude of different servers.

In the illustrated example, client peer 102 has a network connection 116 through the wide area network 90 to the source server 110 capable of transmitting data at 1 Mbps. Client peer 102 has a similar network connection 118 to a first super-peer 112. Client peer 102 has a slower network connection 120 to a second super-peer 114 that is only capable of transmitting data at 0.5 Mbps. Meanwhile, client peer 102 has a faster network connection 124 to a remote server peer 106 capable of 5 Mbps data transfer, and an even faster network connection 122 to a remote server peer 104 capable of 10 Mbps data transfer. As each of these network connections transmits across the wide area network 90, each is slower than the network connection 126 to a local server peer 108, which is capable of 1 Gbps data transfer. These differences in network speeds can be due to the inherent nature of the networking technology used (such as communicating over a wide area network 90 as opposed to a local area network 92), and can also be due to transient conditions and/or geographic location on the network (such as high levels of concurrent traffic or other network bottlenecks between the hosts).

In the illustrated example, client peer 102 selects servers from which to request data based on the available network bandwidth. For example, client peer 102 can choose to request peer information from super-peer 112 instead of super-peer 114 due to the higher speed connection. As another example, client peer 102 can attempt to obtain as much of the media file from local peer server 108 as possible, and can refrain from resorting to the lower speed connections to remote server peer 104 and remote server peer 106 until a portion of the media file is needed that is not available from the local server peer 108. In this way, client peer 102 is able to maximize the quality of the downloaded media file by using the highest bandwidth connection available, even when network conditions or peer availability change during the download.

Figure 2:
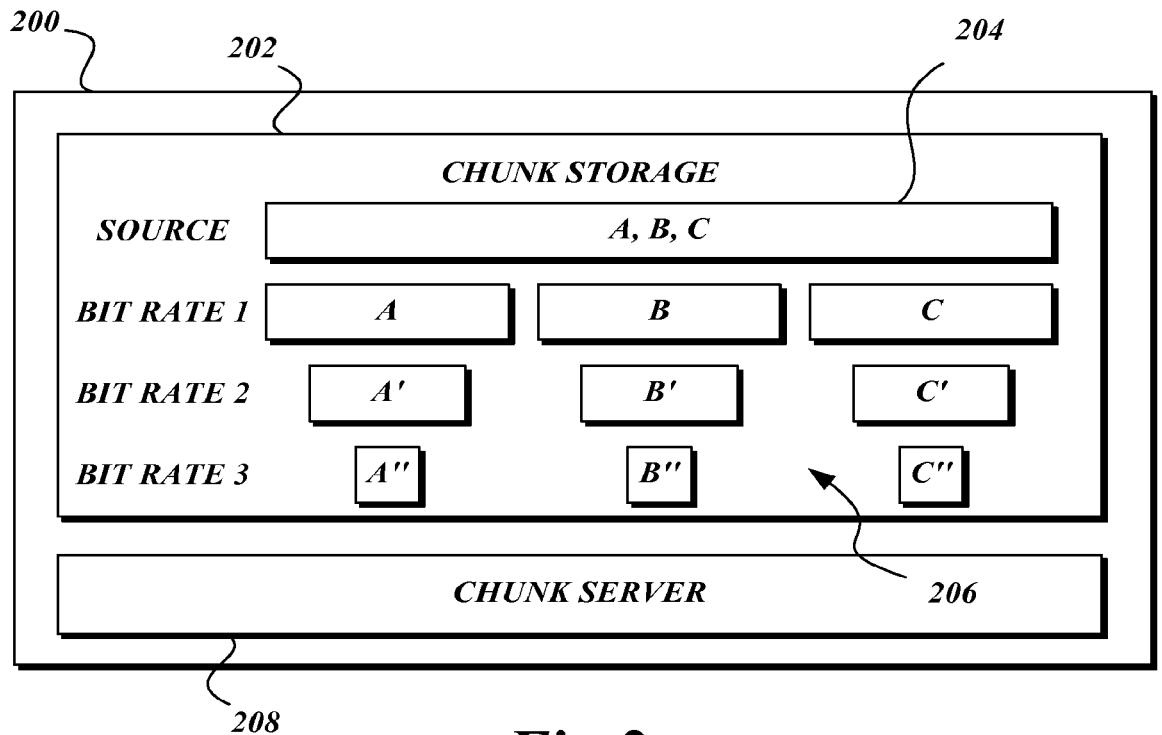
FIG. 2 is a general block diagram of an exemplary device in accordance with some embodiments of the disclosed subject matter.

FIG. 2 illustrates one embodiment of a source server 200 according to various aspects of the present disclosure. Source server 200 is similar to source server 110 illustrated above and includes source chunk storage 202 and a chunk server 208. The source chunk storage 202 stores a complete copy of a source data 204 which, in this example, represents a media file. This source data 204 is then divided into a plurality of chunks 206 of varying levels of quality. As illustrated, the source data 204 is broken into three large pieces A, B, C, which are encoded for transmission at bit rate 1. In this example, bit rate 1 is the highest available bit rate, which results in a larger chunk being transferred between the source server 200 and a client peer. The source data 204 is also broken into three somewhat smaller chunks A', B', C' for transmission at bit rate 2. In this regard, bit rate 2 is lower than bit rate 1, so the chunks A', B', C' are smaller and may be transferred in approximately the same amount of time as chunks A, B, C, but at the lower bit rate. Likewise, the source data 204 is broken into even smaller chunks A", B", C" for transmission at bit rate 3, the lowest supported bit rate.

Chunk server 208 sends chunks 206 to client peers upon request. In one embodiment, the client peer requests a given chunk at a given bit rate. In other embodiments, the client peer requests a given chunk, and the chunk server 208 determines an appropriate bit rate before sending the chunk. Chunk server 208 can also provide the web application that initially directs the peer-to-peer client to the client peer.

In one aspect, one or more of the elements of source server 200 can be included in a peer, such that source server 200 would have similar behavior to any of the other peers in the system 100, with the exception of always being available and containing a complete copy of the source data 204.

Figure 3:
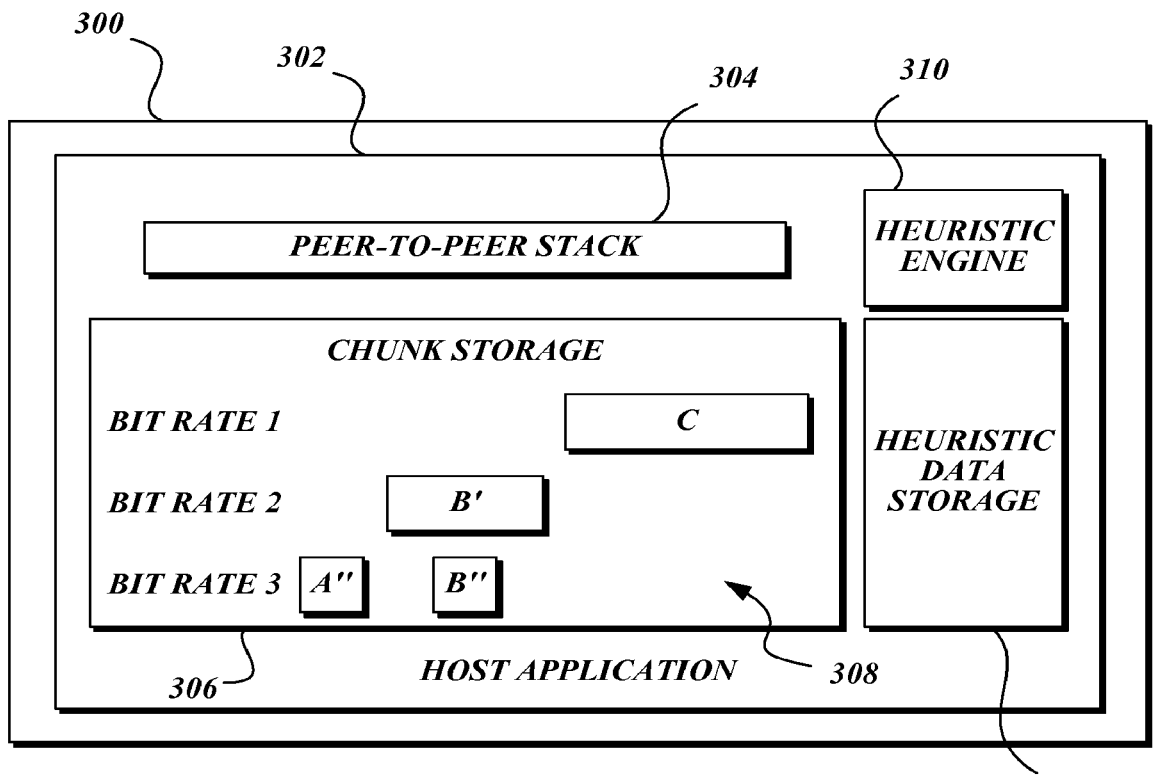
FIG. 3 is a general block diagram of an exemplary device in accordance with some embodiments of the disclosed subject matter.

FIG. 3 illustrates one embodiment of a peer 300 according to various aspects of the present disclosure. The illustrated peer 300 functions as both a client peer 102 and as a server peer 104, 106, 108 at various times. The peer 300 executes a host application 302. One example of an appropriate host application 302 is a general purpose web browser, though other host applications can be used without departing from the scope of the claimed subject matter.

In the example illustrated in FIG. 3, host application 302 hosts a peer-to-peer stack 304 and a heuristic engine 310 provided by the present disclosure. The peer-to-peer stack 304 manages communications between the peer 300 and other peers, as well as between the peer 300 and one or more super-peers. This communication at least includes downloading chunks, downloading information about other peers, registering the peer 300 with a super-peer, and sensing network conditions. The heuristic engine 310 analyzes the downloaded information, and stores the analyzed heuristic data in the heuristic data storage 312. In this regard, the heuristic data may include but is not limited to the identity and location of fellow peers, network latency and bandwidth between the peer 300 and other points in the peer-to-peer network, identity of chunks available at each fellow peer, location and identity of super-peers, among others. After building an initial "weather map" of the network, the heuristic engine 310 continues to monitor the communications of the peer-to-peer stack 304, and updates the stored heuristic data to reflect changing network conditions. The data stored in the heuristic data storage 312 includes historical data for previous connections, which helps improve predictions generated by the heuristic engine 310.

As discussed above, the host application 302 segregates local resource access based on the domain that the host application 302 is accessing. Peer chunk storage 306 of the host application 302 is illustrated as storing peer chunks 308 corresponding to the same domain as illustrated in FIG. 2. FIG. 3 illustrates an exemplary state of peer chunk storage 306 after having accessed an entire source content. Early in the content when the peer 300 is attempting to fill a buffer, the peer 300 typically downloads smaller chunks such as A" and B" to ensure that an adequate amount of data will be available to initiate playback of the content. Later, when the buffer is full and the heuristic engine 310 is more aggressive about the amount of time available to download content, larger chunks such as B' and C are downloaded. These heuristic techniques are described further below.

Figure 4:
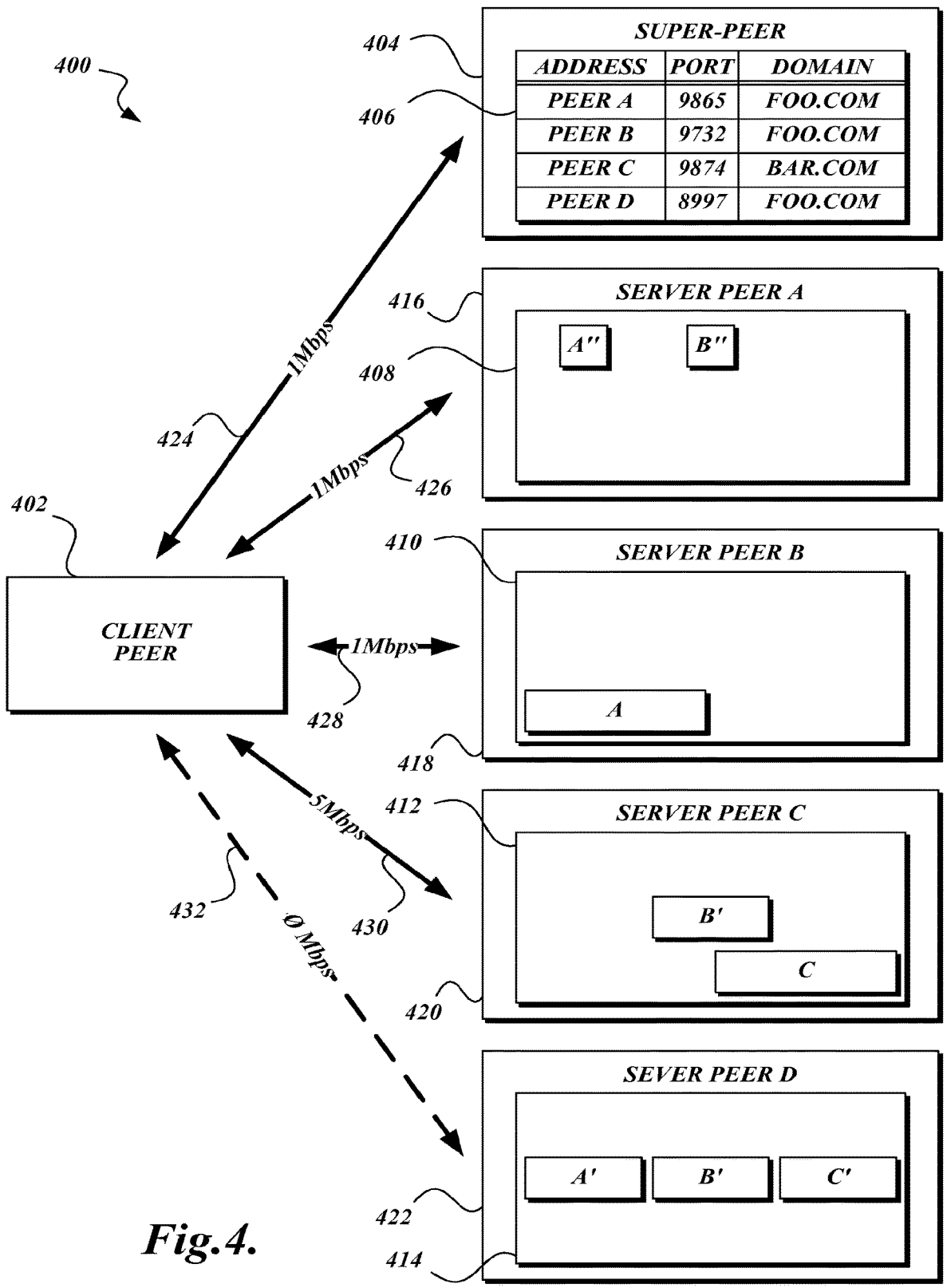
FIG. 4 is a block diagram depicting an exemplary environment where described embodiments of the disclosed subject matter can be implemented.

FIG. 4 illustrates one embodiment of a peer-to-peer topology 400 according to various aspects of the present disclosure. When the peer-to-peer stack 304 of client peer 402 first accesses a given domain, it opens a connection endpoint referencing a local port that is not currently in use. If no other peer-to-peer stacks are executing on client peer 402, the new peer-to-peer stack can open a default port. If another peer-to-peer stack is already executing on client peer 402, the new peer-to-peer stack opens a different port. The port being opened can be chosen according to a predetermined order, randomly, or by any other appropriate method known to those of skill in the art.

Next, the peer-to-peer stack 304 of the client peer 402 opens a connection to a super-peer 404 which may be found in a number of different ways. The location of the super-peer 404 can be well-known, and the peer-to-peer stack 304 would merely need to connect to the well-known location. In another embodiment, the location of the super-peer 404 changes, and the peer-to-peer stack 304 searches for the location of the super-peer 404 by broadcasting packets to, for example, a source server, other previously connected peers, and the like.

Once connected to the super-peer 404, the client peer 402 informs the super-peer 404 of the address, port, and domain being used by the client peer 402. In one embodiment, the super-peer 404 stores this information in a peer identification store 406 along with similar information for other peers. Once registered, the client peer 402 then receives information from the super-peer 404 concerning the address, port, and domain being used by other peers in the peer-to-peer topology 400.

The client peer 402 uses the information obtained from the super-peer 404 to contact the other peers. For example, client peer 402 can attempt to contact each of the peers identified by the super-peer 404 to determine if the information stored by the super-peer 404 is still valid. That is, if a peer disappears from the peer-to-peer topology 400 through the loss of a network connection, a change in domains, and the like, the peer may or may not notify the super-peer 404 it is leaving the peer-to-peer topology 400. An attempt by the client peer 402 to contact each of the identified peers ensures that the state information is current.

Once the client peer 402 determines that a given peer is online and available, the client peer 402 requests chunk information from the other peers, and analyzes the network conditions over the path of the connection. For example, client peer 402 contacts server peer A 416, which is active in domain "foo.com" on port 9865, and requests its chunk information. Server peer A 416 responds and indicates that its peer chunk store 408 contains low bitrate peer chunk A" and low bitrate peer chunk B". From this response, client peer 402 determines that the available bandwidth of the network connection 426 between client peer 402 and server peer A 416 is 1 Mbps. A similar information exchange occurs between client peer 402 and server peer B 418. As illustrated in FIG. 4, peer B 418 stores high bitrate peer chunk A in the peer chunk store 410, which is capable of being transmitted over the network connection 428 at 1 Mbps.

Though server peer C 420 has relevant peer chunks B' and C in its peer chunk store 412, the peer identification information indicated that server peer C 420 is currently active in domain "bar.com." In one embodiment, client peer 402 will therefore not attempt to contact server peer C 420. In another embodiment, client peer 402 nevertheless records the existence of server peer C 420 and the bandwidth of its network connection 430 in its heuristic data storage 312, in case this information could be of use in the future. In this example, client peer 402 attempts to contact server peer D 422, but finds that the network connection 432 between client peer 402 and server peer D 422 is inaccessible.

Client peer 402 stores the information received from the server peers in its heuristic data storage 312. In displaying a streaming media file, the order in which chunks are obtained matters as the content is displayed sequentially. The portions of the content can be obtained out of order, but the display of the media file cannot begin until some version of the first portion is retrieved. The heuristic engine 310 uses the received information to develop a plan for downloading the highest possible quality portions of the media file, while maintaining consistent playback of the media.

Many different heuristic strategies can be deployed for downloading the peer chunks. In one embodiment, the heuristic engine 310 calculates how many low-bandwidth peer chunks would have to be downloaded to fill a buffer, and plans to download that many peer chunks, in chronological order, until the buffer is full. Once the buffer is full, the heuristic engine 310 may seek higher bandwidth peer chunks, either to replace chunks that have already been downloaded, or as new chunks for later in the presentation. Early in the presentation, the heuristic engine 310 can prefer connecting to peers with low-bandwidth peer chunks to maximize the speed of filling the buffer, and can switch later in the presentation to prefer connecting to peers with known reliable, high bandwidth connections with the client peer 402.

In the illustrated example, client peer 402 would begin searching for server peers that have some version of portion A. Client peer 402 finds that both server peer A 416 and server peer B 418 have versions of portion A. Given that playback should be initiated quickly, client peer 402 will likely choose to download chunk A" from server peer A 416, despite the higher quality of chunk A on server peer B 418, to maximize the speed with which the presentation to the user can begin. However, higher quality chunks may be selected in instances when performance would not be substantially affected.

Figure 5:
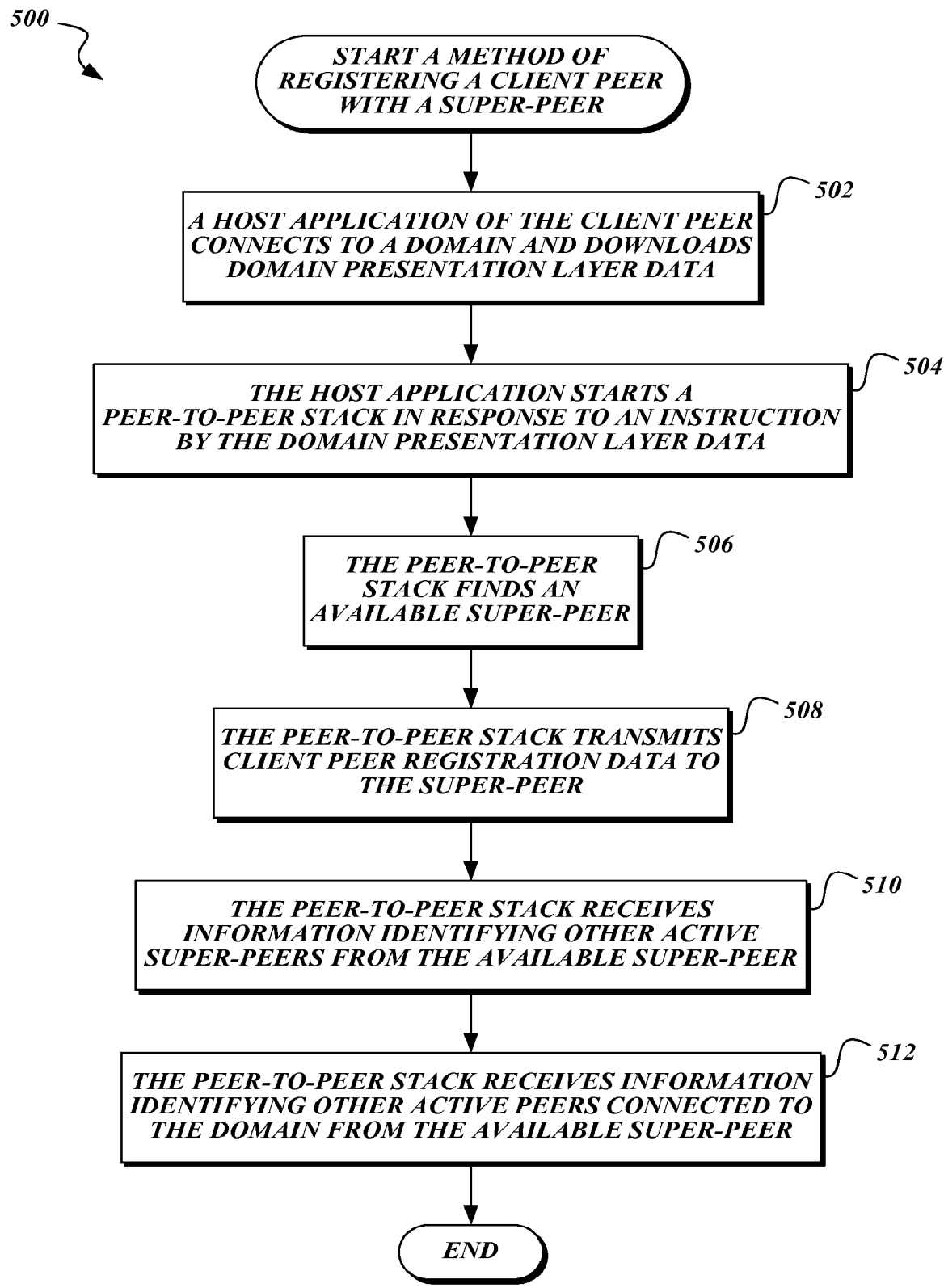
FIG. 5 is a flow diagram of a routine for registering with a super-peer in accordance with some embodiments of the disclosed subject matter.

FIG. 5 illustrates one embodiment of a method 500 of registering a client peer 102 with a super-peer 112. From a start block, the method 500 proceeds to block 502, where a host application 302 of the client peer 102 connects to a domain and downloads domain presentation layer data. In one example, connecting to a domain could include connecting to a news web site and downloading an HTML, page, JavaScript, or other similar data that defines the presentation of the content. Next, at block 504, the host application 302 starts a peer-to-peer stack 304 in response to an instruction by the domain presentation layer data. The method 500 then proceeds to block 506, where the peer-to-peer stack 304 finds an available super-peer 112. As discussed above, the peer-to-peer stack 304 can use one of a number of techniques for finding the super-peer 112, such as transmitting broadcast packets or attempting to connect to a known good address.

Next, at block 508, the peer-to-peer stack 304 transmits client peer registration data to the super-peer 112. This registration data includes a port number that the peer-to-peer stack 304 is listening to, an address of the client peer 102, and the domain on which client peer 102 is active. The method 500 then proceeds to block 510, where the peer-to-peer stack 304 receives information that identifies other active super-peers from the available super-peer 112. The peer-to-peer stack 304 may store this information for future reference, in case the available super-peer 112 is taken offline or is otherwise unreachable. Next, at block 512, the peer-to-peer stack 304 receives information identifying other active peers connected to the domain from the available super-peer 112. As discussed above, this information includes network status information, peer chunk availability, and the like. The method 500 then proceeds to an end block and terminates.

Figure 6:
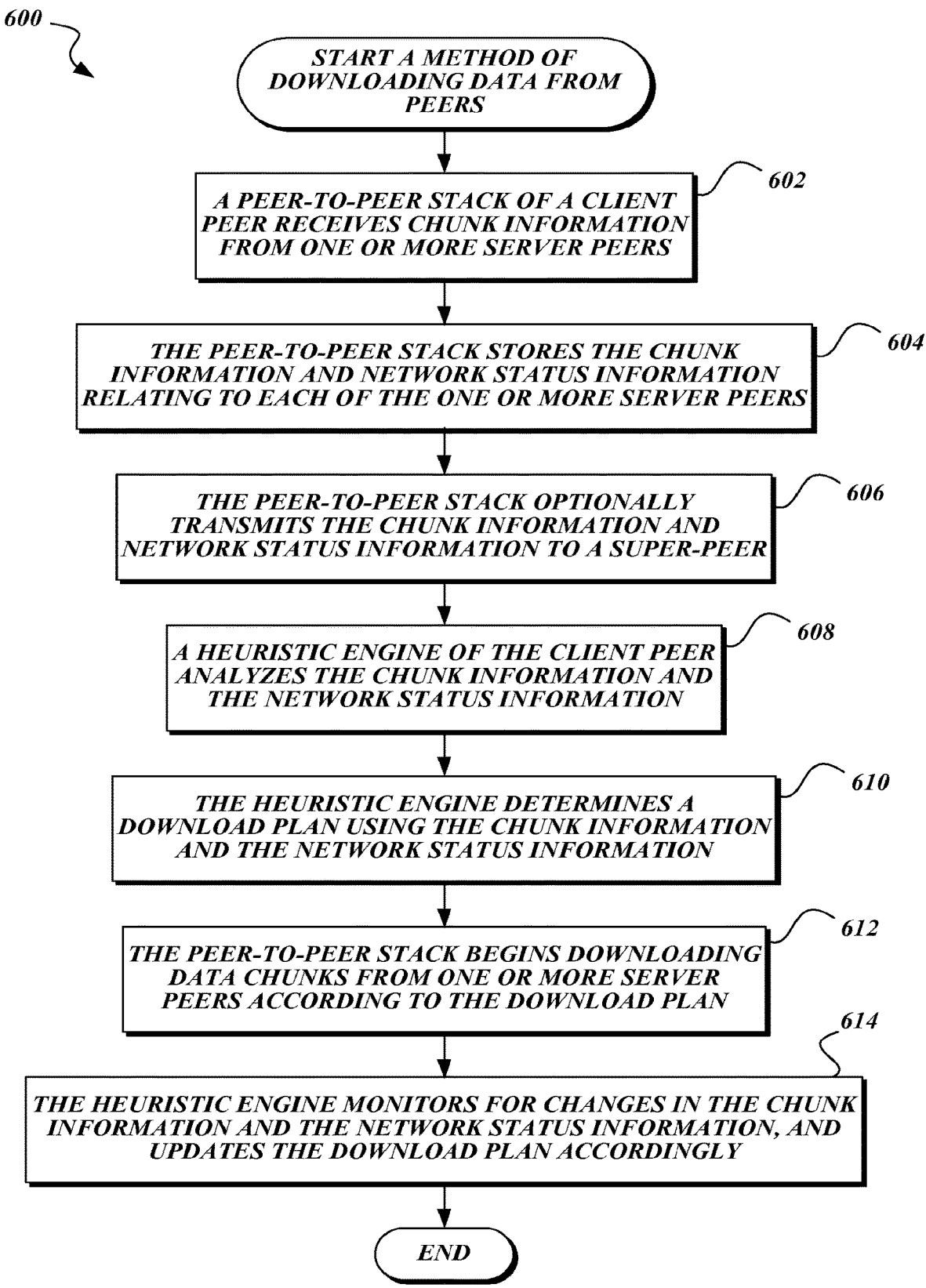
FIG. 6 is a flow diagram of a routine for obtaining content from one or more peers in accordance with some embodiments of the disclosed subject matter.

FIG. 6 illustrates one embodiment of a method 600 of downloading data from peers. From a start block, the method 600 proceeds to block 602, where a peer-to-peer stack 304 of a client peer 102 receives chunk information from one or more server peers. Next, at block 604, the peer-to-peer stack 304 stores the chunk information and network status information that relates to each of the one or more server peers. The method 600 then proceeds to block 606, where the peer-to-peer stack 304 optionally transmits the chunk information and network status information to a super-peer 112. In embodiments that employ this optional step, the client peer 102 can download the chunk information and network status information directly from the super-peer 112, which increases the speed of the initial collection of heuristic data and provides greater historical information on which to base the heuristic decisions.

Next, at block 608, a heuristic engine 310 of the client peer 102 analyzes the chunk information and the network status information. The method 600 then proceeds to block 610, where the heuristic engine 310 generates a download plan for accessing particular content using the obtained chunk information and the network status information. Next, at block 612, the peer-to-peer stack 304 begins downloading data chunks from one or more server peers according to the download plan. The method 600 then proceeds to block 614, where the heuristic engine 310 monitors for changes in the chunk information and the network status information, and updates the download plan accordingly. The heuristic engine 310 can periodically ping the super-peer 112 to access current information about various network conditions and other peers. The heuristic engine 310 can also ping the server peers directly to determine their status, or can eavesdrop on the communication between the peer-to-peer stack 304 and the server peers during the course of downloading the content. Next, the method 600 continues to an end block and terminates.

Figure 7:
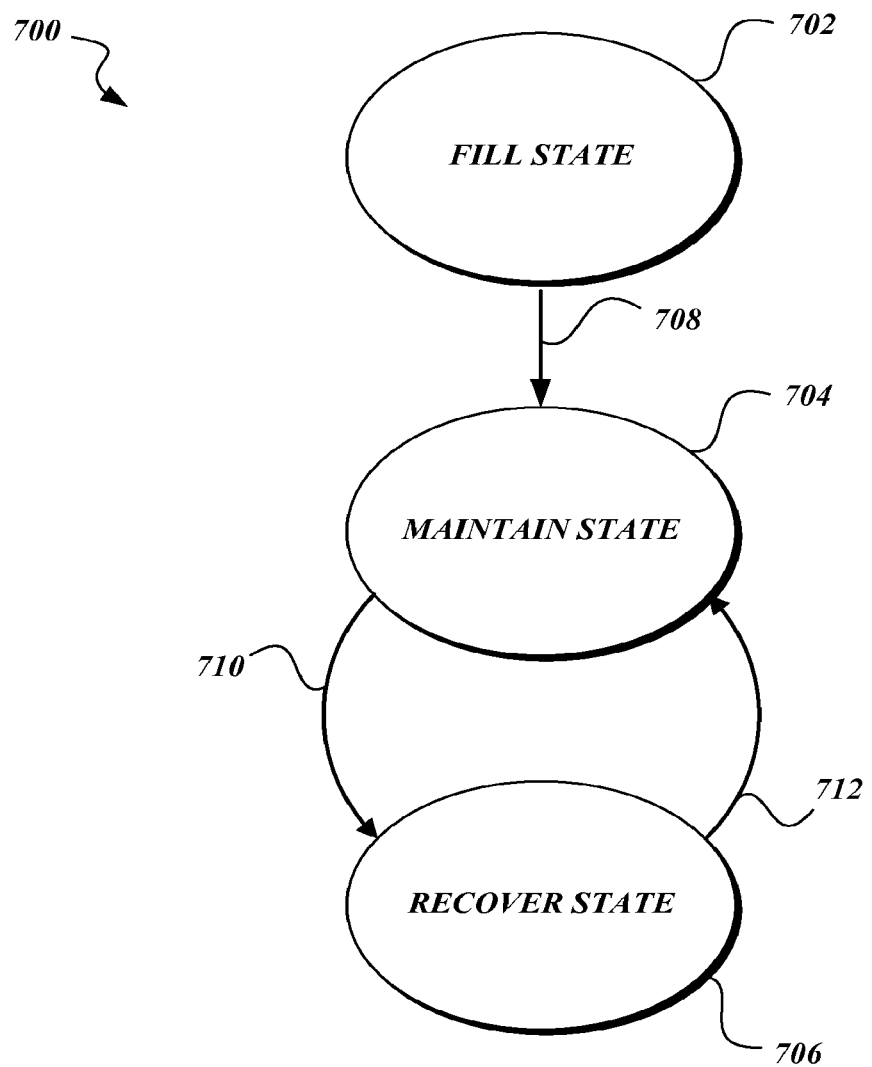
FIG. 7 is a general block diagram depicting a state machine suitable for illustrating additional aspects of the disclosed subject matter.

In one aspect, the heuristic engine 310 adapts the download plan according to multiple goals. These goals include starting the presentation without delay and providing as high a quality presentation as possible. As such, the heuristic engine 310 balances the goal of keeping a play buffer substantially full with content from a chunk even if the chunk is of low quality, versus finding high-quality chunks that will be transferable in the time needed to keep the buffer full. FIG. 7 illustrates a state diagram 700 that illustrates how one embodiment of the heuristic engine 310 balances these goals. When a download is initiated, the heuristic engine 310 enters the fill state 702. In this state, the heuristic engine 310 searches the peer-to-peer topology for chunks that will fill the beginning of the play buffer as quickly as possible. Moreover, in the fill state 702, the heuristic engine 310 prioritizes high bandwidth connections over low bandwidth connections, and peers that have early chunks over late chunks.

Once the play buffer is full, the heuristic engine 310 follows a transition 708 into the maintain state 704. In the maintain state 704, the heuristic engine 310 attempts to maximize the quality of the presentation given the network conditions. In this case, the heuristic engine 310 prioritizes high-quality chunks over low-quality chunks, and is less concerned with bandwidth or the position of the chunk in the presentation. Hence, the heuristic engine 310 can choose to begin downloading a high quality chunk that is later in the presentation over a medium quality chunk that is earlier in the presentation, given that adequate time is likely available to obtain the earlier chunk before the buffer is empty.

If the buffer does empty to the point where smooth playback is in danger of being interrupted, the heuristic engine 310 follows a transition 710 into the recover state 706. The recover state 706 is similar to the fill state 702, in that earlier, lower quality chunks will be given higher priority. Once the heuristic engine 310 has managed to fill the buffer back up to a predetermined amount, the heuristic engine 310 follows a transition 712 back into the maintain state 704.

While illustrative embodiments have been illustrated and described, it will be appreciated that various changes can be made therein without departing from the spirit and scope of the invention.

What is claimed is:

1. A method for facilitating peer-to-peer data exchange in a common domain, said method comprising:
obtaining data that identifies chunks of content available for download from a set of peers, wherein the chunks of content have previously been encoded for transmission at different bit rates, including relatively low bit rates, and wherein the set of peers includes a first peer, a second peer, and a third peer;
using a heuristic engine to determine how many successive chunks of the content that are encoded for transmission at the relatively low bit rates would be needed to subsequently fill a buffer of the first peer such that a determined number of the successive chunks is determined prior to filling the buffer, wherein said determining facilitates a selection process performed by the heuristic engine to select which one or more peers from the set of peers the first peer is to initially connect with to maximize a speed by which the buffer of the first peer is filled;
based on said determination, selecting a first chunk of content to download from the second peer to the buffer of the first peer;
downloading the first chunk of content from the second peer onto the first peer;
in response to a detected change in network conditions, selecting a second chunk of content to download from the third peer, wherein the selection of the second chunk of content is based, at least in part, upon one or a combination of (i) a bit rate for which the second chunk of content has been encoded for transmission, (ii) a size of the second chunk of content, and (iii) an amount of bandwidth that is available for a connection between the first peer and the third peer; and
downloading the second chunk of content from the third peer to the buffer of the first peer.

2. The method of claim 1, wherein the first peer makes peer selections to maximize bandwidth for downloading the first chunk of content from the second peer.

3. The method of claim 1, wherein selecting the first chunk of content comprises at least one of:
the first peer requests the first chunk of content be downloaded at a specified bit rate;
the first peer requests the first chunk of content be downloaded, and a super-peer determines an appropriate bit rate for downloading the first chunk of content; or the super-peer provides a web application that directs the first peer to the second peer that will download the first chunk of content to the first peer.

4. The method of claim 1, further comprising:
managing communications between the set of peers and a super-peer using a peer-to-peer stack,
wherein obtaining the data comprises:
storing heuristic data about the set of peers on the domain using the heuristic engine.

5. The method of claim 4, wherein the heuristic data includes one or more items selected from the group consisting of:
an identity of each peer included in the set of peers;
a location of each peer included in the set of peers;
a network latency;
an available transmission bandwidth between points in the domain;
an identification of chunks of content available at each peer included in the set of peers;
a location of super-peers on the domain; and
an identity of super-peers on the domain.

6. The method of claim 4, further comprising using the heuristic engine to monitor communications of the peer-to-peer stack and to update the heuristic data that is stored to reflect changing network conditions.

7. The method of claim 4, wherein the method further comprises:
downloading the successive chunks of the content that are encoded for transmission at the relatively low bit rates until the buffer of the first peer is full.

8. The method of claim 7, further comprising:
using the heuristic engine to identify chunks of content that have been encoded for transmission at relatively higher bit rates; and
after the buffer of the first peer is full of the successive chunks of content encoded for transmission at the relatively low bit rates, either:
replacing the successive chunks of content that have already been downloaded with corresponding chunks of content that were encoded for transmission at the relatively higher bit rates; or
downloading further successive chunks of content encoded for transmission at the relatively higher bit rates.

9. The method of claim 4, wherein selecting the first chunk of content to download comprises initially downloading chunks of content from peers connected to the first peer over a relatively low bandwidth connection to maximize the speed by which the buffer of the first peer is filled, and subsequently, downloading chunks of content from the other peers connected to the first peer over a relatively high bandwidth connection.

10. The method of claim 4, further comprising using the heuristic engine to generate a download plan for accessing particular content from the set of peers using chunk information and network status information obtained from a super-peer.

11. The method of claim 10, further comprising using the heuristic engine to determine changes in the chunk information and in the network status information and updating the download plan based on the changes, wherein the heuristic engine adapts the download plan to achieve at least one goal selected from a plurality of goals consisting of:
starting a presentation of the particular content without delay;
providing as high a quality presentation of the particular content as possible;

keeping the buffer of the first peer substantially full with one or more chunks of content, even if the one or more chunks of content are of low quality; and finding high quality chunks of content that can be downloaded sufficiently fast to keep the buffer of the first peer full.

12. The method of claim 1, further comprising, prior to downloading the second chunk of content from the third peer to the first peer:

determining that the second chunk of content is not available at a requested bit rate;

transcoding the second chunk of content into the requested bit rate; and storing the second chunk of content at the requested bit rate.

13. The method of claim 12, wherein the heuristic engine operates in a plurality of different states, including:

a fill state when a download of one or more chunks of content is initiated to fill the buffer, wherein chunks of content are selected that will initially fill the buffer as quickly as possible, and wherein priority is given to downloading chunks of content that are selected over relatively high bandwidth connections, rather than over relatively low bandwidth connections, and to downloading chunks of content earlier in a presentation rather than later;

a maintain state, after the buffer is full, wherein the heuristic engine tries to maximize a quality of the presentation that can be achieved, for current network conditions, by giving priority to higher quality chunks of content that are encoded for transmission at a relatively higher bit rate over lower quality chunks of content that are encoded for transmission at a relatively lower bit rate, so long as chunks of content are available in the buffer in time to be accessed for the presentation; and a recover state, if the buffer is emptying chunks of content to a point where continuity of the presentation is threatened, wherein the recover state is similar to the fill state in that downloading of lower quality chunks of content is given priority over downloading of higher quality chunks of content until the buffer is refilled at least a predetermined amount with chunks of content, thereby enabling the heuristic engine to return to operation in the maintain state.

14. A system for enabling content to be transferred within a domain, said system comprising:

one or more processors; and one or more hardware storage devices that store instructions that are executable by the one or more processors to cause the system to at least:

obtain data that identifies content available for download from a set of peers, wherein the content is divided into chunks of content, wherein the chunks of content available from the set of peers have been encoded for transmission at various bit rates, including relatively low bit rates, and wherein the set of peers includes a first peer, a second peer, and a third peer;

use a heuristic engine to determine how many successive chunks of content that are encoded for transmission at the relatively low bit rates would be needed to subsequently fill a buffer of the first peer such that a determined number of the successive chunks is determined prior to filling the buffer, wherein said determining facilitates a selection process performed by the heuristic engine to select which one or more peers from the set of peers the first peer is to initially connect with to maximize a speed by which the buffer of the first peer is filled;

based on said determination, select a first chunk of content to download from the second peer to the buffer of the first peer;

download the first chunk of content from the second peer onto the first peer;

in response to a detected change in network conditions, select a second chunk of content to download from the third peer, wherein the selection of the second chunk of content is based, at least in part, upon one or a combination of (i) a bit rate for which the second chunk of content has been encoded for transmission, (ii) an amount of bandwidth that is available for communication between the first peer and the third peer, and (iii) a size of the second chunk of content; and download the second chunk of content from the third peer to the buffer of the first peer.

15. The system of claim 14, wherein the heuristic engine of the first peer selects the second peer from which to download the first chunk of content to maximize a bandwidth for downloading the first chunk of content, said selecting being further based on a quality of the first chunk of content.

16. The system of claim 14, wherein:

the heuristic engine of the first peer selects a specific chunk of content to be downloaded from another peer at a specified bit rate, or the heuristic engine requests the specific chunk of content to be downloaded and a super-peer determines an appropriate bit rate for downloading the specific chunk of content from an appropriate other peer, or the super peer provides a web application to the first peer, the web application directing the first peer to another peer that will download the specific chunk of content to the first peer.

17. The system of claim 14, wherein a peer-to-peer stack manages communications over a network between the set of peers, and wherein the heuristic engine stores heuristic data about the set of peers.

18. A system for facilitating peer-to-peer data exchange within a domain such that a domain-based peer-to-peer network is established, where the network allows users to access content from potentially multiple peers, said system comprising:

one or more processors; and one or more hardware storage devices that store instructions that are executable by the one or more processors to cause the system to at least:

determine that content is available for download from a set of peers, wherein the content is divided into chunks of content and is distributed among the set of peers, wherein the set of peers includes a first peer, a second peer, and a third peer, and wherein the chunks of content have previously been encoded for transmission at different bit rates, including relatively low bit rates;

use a heuristic engine to determine how many successive chunks of content that are encoded for transmission at the relatively low bit rates would be needed to subsequently fill a buffer of the first peer such that a determined number of the successive chunks is determined prior to filling the buffer, wherein said determining facilitates a selection process performed by the heuristic engine to select which one or more peers from the set of peers the first peer is to initially connect with to maximize a speed by which the buffer of the first peer is filled;

based one said determination, identify a first chunk of content to download from the second peer to the buffer of the first peer;

download the first chunk of content from the second peer;

in response to a detected change in network conditions, identify a second chunk of content to download from the third peer, wherein the selection is based on one or a combination of (i) a bit rate of the second chunk of content, (ii) an amount of bandwidth that is available to download the second chunk of content, and (iii) a size of the second chunk of content; and switch from using the second peer to download to using the third peer to download such that the second chunk of content is downloaded from the third peer and not the second peer.

19. The system of claim 18, wherein the heuristic engine selects the third peer from which to download the second chunk of content.

20. The system of claim 19, further comprising heuristic data stored by the heuristic engine, and wherein the heuristic data includes one or more of:

identities of other peers on the domain;

locations of the other peers on the domain;

a network latency;

an available transmission bandwidth between points in the domain;

an identification of chunks of content available at the other peers on the domain;

a location of one or more super-peers on the domain; and an identity of the one or more super-peers on the domain.

\* \* \* \* \*